United States Patent [19]

Ezzell et al.

[11] 4,376,030

[45] Mar. 8, 1983

[54] ELECTROLYTIC CELL ION-EXCHANGE MEMBRANES

[75] Inventors: Bobby R. Ezzell, Lake Jackson; Harry S. Burney, Jr., Clute; Marius W. Sorenson, Lake Jackson, all of Tex.

[73] Assignee: The Dow Chemical Company, Midland, Mich.

[21] Appl. No.: 240,349

[22] Filed: Mar. 4, 1981

Related U.S. Application Data

[63] Continuation-in-part of Ser. No. 70,183, Aug. 27, 1979.

[51] Int. Cl.³ .............................................. C25B 13/08
[52] U.S. Cl. .................................................... 204/296
[58] Field of Search ................................ 204/296, 301

[56] References Cited

U.S. PATENT DOCUMENTS

| | | | |
|---|---|---|---|
| 3,654,125 | 4/1972 | Leitz | 204/301 |
| 3,657,104 | 4/1972 | Hodgdon | 204/301 |
| 3,969,285 | 7/1976 | Grot | 204/262 X |
| 4,225,400 | 9/1980 | Gunjima et al. | 204/98 |
| 4,246,041 | 1/1981 | Murayama et al. | 204/296 |

*Primary Examiner*—F. Edmundson
*Attorney, Agent, or Firm*—W. J. Lee

[57] ABSTRACT

Electrolytic cell ion-exchange membranes, comprising fluoropolymers having pendant sulfonic acid functional groups and/or carboxylic acid functional groups, are treated with primary, secondary, and/or tertiary amines to provide dimensional stability and other improvements to the membranes. The treatment with amines provides easily-disassociable amines salts which are leached out by an aqueous leachant, e.g., cell electrolyte, thereby providing sulfonic acid groups and/or carboxylic acid groups to function as ion exchange sites in the membrane during subsequent cell operation.

14 Claims, No Drawings

ELECTROLYTIC CELL ION-EXCHANGE MEMBRANES

CROSS-REFERENCE TO RELATED APPLICATION

This is a continuation-in-part of application Ser. No. 070,183, filed Aug. 27, 1979.

BACKGROUND OF THE INVENTION

There have been various disclosures and teachings to the use of cation-exchange membranes in electrolytic processes, e.g., chlor-alkali cells where aqueous NaCl is electrolyzed by an electric current between anode and cathode and where the electrolyte is separated into anolyte and catholyte portions by a substantially hydraulically-impermeable membrane. In chlor-alkali membrane cells caustic (NaOH) collects in the catholyte (substantially salt-free), hydrogen gas is evolved at the cathode, and chlorine gas is evolved from the NaCl-rich anolyte at the anode. Ordinarily the hydrogen and chlorine products are evolved and removed from the cells at about atmospheric pressure, though there are some cells which have been disclosed as pressure cells wherein the chlorine is removed under pressure as a liquid, or where the hydrogen and chlorine are removed as gases at above atmospheric pressure.

The cation-exchange membranes of particular interest in the present invention are those prepared from fluoropolymers and which contain pendant sulfonic acid functional groups and/or carboxylic acid functional groups. The sulfonic acid groups and carboxylic acid groups may derive from polymers prepared from monomers which contain such groups or may be substituted onto the fluoropolymer after polymerization. Hydrolyzed copolymers of a prefluorinated hydrocarbon (e.g., tetrafluoroethylene) and fluorosulfonated perfluorovinyl ethers (e.g., $FSO_2CF_2CF_2OCF(CF_3)CF_2OCF=CF_2$ and $FSO_2CF_2CF_2OCF=CF_2$) having eq. wts. in the range of about 800 to 2000 are of particular interest. Another fluoropolymer of particular interest is sulfostyrenated perfluoroethylene-propylene, which is prepared by styrenating an FEP (fluorinated ethylene-propylene) copolymer, then sulfonating the polymer. Also of interest are fluoropolymers which contain pendant R—COOH groups having eq. wts. in the range of about 500 to 1500; these polymeric membranes may, alternately, also contain sulfonic acid, R—$SO_3H$ groups. Layered membranes having functional groups in one layer which are predominantly, or substantially all, of the carboxylic type, and in another layer which are predominantly, or substantially all, of the sulfonic acid type, are of interest. Methods of making such polymers are known to practitioners of these arts and the making of them is not within the purview of the present invention. It is within the purview of the present invention to treat such polymer membranes with certain amines, under certain conditions, to form easily disassociable amine salts whereby the amines are leached out during use in an aqueous electrolyte, thereby returning the sulfonic and carboxylic functional groups to their original acid state.

The easily disassociable salt groups employed in the present invention are not the same as groups formed by reacting a base, such as an amine, with acid halide groups (e.g., sulfonyl halide) to form amides, such as sulfonamides or carboxamides. Such amide groups are much more difficult to be returned to their original acid forms by an aqueous leaching.

It is known in the arts that fluoropolymers containing pendant sulfonyl halide groups may be saponified to convert the sulfonyl halide groups to sulfonic acid functionality groups. This may be demonstrated by the following equation, where R represents the portion of the polymer molecule to which the group is attached:

$$R-SO_2F + 2NaOH \xrightarrow{\Delta} R-SO_3Na + NaF + H_2O$$

The R—$SO_3Na$, in acidic medium, becomes R—$SO_3H$.

It is also known that fluoropolymers containing R—COOH groups can be converted to carboxylate groups, e.g., R—COONa, or carboxamides, e.g., R—$CONH_2$, with R representing attachment to the fluoropolymer.

In contradistinction thereto, the present invention relies on preparing easily disassociable amine salts which may be represented by the formulae:
R—$SO_3H$.(amine) and R—COOH.(amine), where (amine) represents a primary, secondary, or tertiary amine as hereinafter described. The amine is not reacted to the point of giving off a mole of $H_2O$ to form a sulfonamide or carboxamide.

Dimensional stability of the cation-exchange membranes is a recognized problem, sometimes with regard to swelling (which can cause sagging) or deswelling (which can cause tautness leading to tearing, cracking, or splitting). The use of various fluoropolymers as cation-exchange membrane material in electrolytic cells, and the problems associated with dimensional instability are a matter of record as shown, e.g., by U.S. Pat. Nos. 3,985,631 and 4,000,057. These patents are believed to be representative of the most relevant prior art.

U.S. Pat. No. 3,985,631 proposes a remedy for the problems associated with dimensional instability of cation-exchange membranes; the remedy includes pre-treatment with aqueous NaOH to introduce hydrated alkali metal ions throughout the membrane.

U.S. Pat. No. 4,000,057 also proposes a remedy for the problems associated with dimensional instability of cation-exchange membranes; the remedy includes pre-swelling of the membrane with an aqueous solution containing one or more solutes of the group consisting of NaCl, ethylene glycol, glycerine, sodium hydroxide, synthetic organic detergents, lower alkanols, higher fatty acids, organic acids, mineral acids, sequestrants, organic solvent materials, sorbitol, mannitol, polyhydric alcohols, and pentaerythritol.

SUMMARY OF THE INVENTION

Cation-active permselective membranes containing sulfonate and/or carboxylate functional groups (also called "cation-exchange membranes") are pre-treated (or pre-conditioned) before use in an electrolytic cell to attain dimensions which are comparable to that they would attain in the operating cell environment, the pre-treatment being done by contacting the membrane with a primary, secondary, or tertiary organic amine, preferably in a solvent, then drying in air. After the amine treatment the membrane undergoes substantially no shrinkage and substantially retains the dimensions attained by the treatment with the amine solution and air drying, thus when placed in operation in a cell is found to undergo no detrimental change in dimension even though the amine is leached out in the cell.

DETAILED DESCRIPTION OF THE INVENTION

Cation-exchange fluoropolymer membranes containing sulfonic acid and/or carboxylic acid functional groups for use in chlor-alkali cells are generally quite thin so as to minimize electrical resistance through the membrane and to permit the interelectrode gap to be minimized and still leave ample space for the electrolytes to circulate. Membranes which swell in operation in the cell sometimes interfere with electrolyte flow and, because of trapped gases, can also cause an increase in cell voltage. For this reason it is desirable to avoid expansion of the membrane after the cell is placed in operation. Pre-swelling the membrane in water or other solvents that do not lead to stabilization of the swelled membrane can lead to cracking or splitting of the membrane while the cell is stored prior to begin placed in service.

It has now been found that pre-treating the instant membranes with a primary, secondary, or tertiary amine will create a substantially irreversible swelling as long as the amine is not removed and the membrane can be stored with substantialy no de-swelling. Thus when placed in operation in a electrolytic cell, the membrane substantially maintains its dimensions and sagging, cracking, and splitting are avoided. An additional benefit is that where the membrane is one which is mounted directly on a steel or iron cathode, the cathode may also become treated with the amine, thus becomes substantially corrosion resistant and may be stored for extended periods of time without encountering substantial corrosion; the amine treatment provides a cathode-supported membrane structure which can be stored for extended periods of time without detrimental effect.

The amine may be a tertiary, secondary, or primary amine and may be a mixture of two or more amines. Triethanolamine is a particularly effective amine, both from the membrane stability aspect and from the cathode corrosion aspect. The amine is preferably one which is soluble in water, but those which are soluble in solvents other than water may be used, e.g., an alcohol, glycol, ethers, etc. It is understood that the solvent is not critical to the present invention, but simply provides a means of transporting the amine into the membrane whereupon reaction occurs with the sulfonic acid group and/or carboxylic acid group to form an amine salt which is easily disassociable; other than that, a solvent is not necessary. By "easily disassociable" it is meant that the amine moiety is readily and quickly washed out of the membrane and does not require stringent hydrolysis conditions required to hydrolyze other derivatives, e.g., amides which are formed by reacting amines with sulfonyl groups or esters, e.g., those formed by condensing carboxylic groups with nucleophiles having reactive hydrogen groups.

The amines may be expressed generically by the empirical formulae:

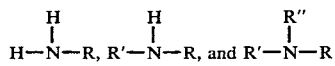

where R, R', and R" are, independently, alkyl, aryl, alkaryl, aralkyl moieties which may be branched or substituted and, in a given compound, may be alike or different.

It appears that the amines react with the sulfonic acid groups and/or the carboxylic acid groups in the membrane, forming an easily disassociable salt. This amine-salt form of the membrane has physical dimensions that approximate those of the membrane in the electrolytes of an operating chlor-alkali cell. Upon drying, the amine-swollen membrane undergoes little or no de-swelling. Then, when placed in service in an electrolytic cell, the membrane undergoes little or no changes in dimensions even though the amine is leached out or removed from the membrane during cell operation, and the slight changes (if any) in dimensions are not detrimental.

In general, the membranes are prepared as follows:

1. The sheet material comprising the desired fluoropolymer is formed having dimensions which are somewhat less than the desired final swelled dimensions. Ordinarily a thickness in the range of about 2 to about 10 mils is employed and while this thickness is also swelled by the amine treatment, the change in the thickness dimension is insignificant, but changes in length and width are significant. The exact dimensions to be desired for a particular membrane are of course, largely dependent on the particular cell dimensions in which the membrane will be used.

2. The fluoropolymer material may be formed in place on the electrolytic cell cathode or anode, may be formed elsewhere and then mounted on the cathode or anode or may be formed as a material to be mounted in a membrane holding device which will position it between the cathode and anode.

3. The membrane is contacted with the desired amine under conditions which will permit appreciable permeation of the amine into the membrane to reach the sulfonic acid groups and/or carboxylic acid groups. This is preferably, and conveniently, done by immersing into, or thoroughly spraying with, the amine dissolved in a solvent (e.g., $H_2O$ or alcohol). The solvent itself may cause some swelling, but the solvent-swelling is generally reversible and does not give dimensional stability to the membrane. The amine is relied on to impart the anti-de-swelling property to the treated membrane. With some amines, the solvent may not be required, but it is generally preferred as a matter of convenience. The length of time required in the amine-contacting step may vary, depending on thickness of the membrane sheet material, the temperature of the amine, and the ability of the amine (or amine solution) to penetrate the membrane. Generally a contacting time of about 2 minutes to about 3 hours is sufficient. Ordinarily a contact time of at least about 10 minutes is recommended to assure appreciable penetration; excessive contact times are not necessarily detrimental but may, in some cases, lead to dimensional increases in excess of those desired. The temperature employed in the contacting step may be, conveniently, at ambient temperature, though lower or higher temperatures may be employed. Temperatures low enough to freeze or gell the amine solution would be expected to be counterproductive as would temperatures high enough to rapidly vaporize the amine and/or solvent. Temperatures between about 20° C. to about 80° C. are preferable though temperatures in the range of 0°–100° C. are usually operable. There is an interdependence between temperature and time involved in the contacting step as well as there being a relationship to the concentration of the amine in the solvent, to the thickness of the membrane, and to the eq. wt. of the polymer. Furthermore, excessive temperatures tend to form relatively stable amides and the leachability of the amine is essentially nil. The relationships of these variables are shown in the examples which follow.

4. After the contacting step, the membranes are dried and may be stored for extended periods of time. This ability to be stored in dry form is important in large scale operations where assembly of electrolytic cells usually requires at least several hours and sometimes many days, during which time it is infeasible to try to maintain membranes in the solvent-wet state. For practical purposes, it is considered necessary that the pre-conditioned membrane withstand the drying stage without substantial shrinkage and the re-wetting stage (during cell operation) without substantial swelling, either of which is usually detrimental.

EXAMPLES A–R

In the following Table I data is reported on the acid form of a membrane comprising hydrolyzed copolymer of tetrafluoroethylene and perfluoro (3,6-dioxa-4-methyl-7-octenesulfonyl fluoride) having equivalent weights of 1100 and 1500 in separate sheets laminated together (a commercial product sold under the tradename Nafion ® 324) which has been contacted with a 30% aqueous solution of triethanolamine (TEA). The linear expansion in the machine direction and the transverse direction is given in percent.

"Machine direction" refers to the dimension parallel to the travel of the sheet as it is removed from the fabricating machine during manufacture; "transverse direction" is the direction normal (at right angle across the sheet) to the machine direction.

TABLE I

| Run No. | Contact Time (min) | Temp. °C. | % Expansion During contact Transverse | Machine | No. Days | % Expansion After Drying Transverse | Machine |
|---|---|---|---|---|---|---|---|
| A | 10 | 23 | 5.6 | 5.9 | 1 | 2.0 | 2.3 |
| B | 10 | 42 | 5.9 | 5.9 | 1 | 3.0 | 3.0 |
| C | 10 | 65 | 7.2 | 7.2 | 1 | 4.6 | 3.6 |
| D | 30 | 23 | 6.3 | 5.9 | 1 | 3.3 | 3.3 |
| E | 30 | 80 | 7.6 | 8.2 | 1 | 5.3 | 3.3 |
| F | 40 | 42 | 7.2 | 7.2 | 1 | 4.6 | 4.3 |
| G | 40 | 65 | 7.9 | 7.2 | 1 | 4.6 | 3.9 |
| H | 60 | 23 | 6.6 | 6.6 | 1 | 3.3 | 3.3 |
| I | 60 | 42 | 7.6 | 7.2 | 1 | 4.3 | 3.9 |
| J | 60 | 65 | 7.9 | 7.9 | 1 | 4.6 | 4.3 |
| K | 180 | 23 | 7.2 | 7.2 | 1 | 4.3 | 4.3 |
| L | 1440 | 23 | 7.9 | 7.6 | 1 | 4.6 | 4.6 |
| M | 2 | 23 | 3.9 | — | 4 | 1.0 | — |
| N | 10 | 23 | 5.6 | — | 4 | 2.3 | — |
| O | 60 | 23 | 6.6 | — | 4 | 3.3 | — |
| P | 180 | 23 | 7.2 | — | 4 | 4.3 | — |
| Q | 1440 | 23 | 7.9 | — | 4 | 4.6 | — |
| R | 30 | 23 | 6.3 | — | 4 | 3.3 | — |

EXAMPLES S–Y

Using the same membrane material as in the above Examples, linear expansion tests were made in which the concentration of the aqueous TEA was varied, using 30 min. contact time at 23° C. The data is shown in Table II.

TABLE II

| Run No. | Conc. TEA | % Expansion After Contact Transverse | Machine | % Expansion After 1 Day Transverse | Machine | After Drying After 5 days Transverse | Machine |
|---|---|---|---|---|---|---|---|
| S | 25 | 5.3 | 5.9 | 3.3 | 3.3 | 3.3 | 3.3 |
| T | 60 | 3.3 | 3.6 | 2.6 | 3.3 | 2.6 | 3.3 |
| U | 40 | 5.3 | 5.6 | 3.3 | 3.3 | 3.3 | 3.3 |
| V | 10 | 6.3 | 5.6 | 2.0 | 1.6 | 2.0 | 1.6 |
| W | 5 | 5.9 | 5.9 | 2.0 | 1.6 | 2.0 | 1.6 |
| X* | 30 | 7.6 | 8.2 | 5.3 | 3.3 | 5.3 | 3.3 |
| Y | 30 | 6.3 | 5.9 | 3.3 | 3.3 | 3.3 | 3.3 |

*Run X was at 80° C.

EXAMPLE Z–LL

Using the same membrane as in the above Examples, various amine solutions were tested at 23°–24° C., except for Run Z which was made at 80° C. The contacting solution and the % expansion (transverse direction) are shown in Table III. Treatment time was 30 minutes.

TABLE III

| Run No. | Contacting Solution Weight ratios | % Expansion After Contact | After 3** days drying |
|---|---|---|---|
| Z | 30 triethanolamine/70 H$_2$O(80° C.) | 7.6 | 5.3 |
| AA | 28 benzylmethyl amine/2HCl/70H$_2$O | 7.2 | 3.3 |
| BB | 25 N,N—dimethylbenzyl amine 6HCl/69H$_2$O | 4.6 | 1.3 |
| CC | 30 n-octylamine/70H$_2$O | 10.5 | 4.9 |
| DD | 0.3 dodecylamine/.8 HCl/98.9H$_2$O | 6.6 | 0.3 |
| EE | 27 t-octylamine/3HCl/70 H$_2$O | 6.3 | 2.6 |
| FF | 30 triethanolamine/70 H$_2$O | 6.3 | 3.3 |
| GG | 20 dodecylamine/80 isopropanol | 7.9 | 5.3 |
| HH | 30 tri-n-octylamine/70 isopropanol | 7.2 | 3.9 |
| II | 30 triethanolamine/5 n-octylamine/ 65 H$_2$O | 7.6 | 4.6 |
| JJ | 20 triethanolamine/10 n-octylamine/ 70 H$_2$O | 8.2 | 4.3 |
| KK | 25 diethanolamine/75 H$_2$O | 5.1 | 2.0 |
| LL* | 100% isopropanol | 7.6 | −0.3 |

*For comparison, not an Example of invention.
**Runs GG, HH, II, JJ, and LL were dried for eleven days.

EXAMPLES MM—PP

Different embodiments of fluoropolymer, similar to that used in the above Examples, except that they comprise single layers of fixed eq. wt. were contacted with 30% aqueous TEA at 80° C. for 30 minutes and at 24° C. for 30 minutes. Two forms of the membrane sheet were used, one form which was about 1-mil thick (having eq. wt. of 1500) and one form which was about 4-mils thick (having eq. wt. of 1100). Weight increase after one day drying was calculated. Linear expansion was measured immediately upon removal from the contacting amine solution and after twelve days of drying. Data is shown in Table IV.

TABLE IV

| Run No. | Temp. C.° | Thick Mils | % Wt. Increase | % Linear Expansion Immediate | 12 days drying |
|---|---|---|---|---|---|
| MM | 80 | 1 | 17 | 7.2 | 4.3 |
| NN | 80 | 4 | 24 | 21.1 | 11.2 |
| OO | 24 | 1 | 19 | 5.6 | 4.3 |
| PP | 24 | 4 | 17 | 16.4 | 8.6 |

EXAMPLES QQ–SS

A bilayer membrane similar to the bilayer membrane of Tables I–III, but comprising a 0.75 mil (1600 eq. wt.)

layer intimately adhered to a 4 mil (1100 eq. wt.) of the fluoropolymer was treated in a 30% aqueous TEA solution and linear expansion in the transverse direction was measured immediately after removal from the amine solution and after 6 days of drying. Data is shown in Table V.

TABLE V

| Run No. | Contact C° | Contact Min. | % Linear Expansion Immediate | % Linear Expansion After 6 days drying |
|---|---|---|---|---|
| QQ | 25 | 30 | 5.9 | 3.0 |
| RR | 80 | 30 | 7.9 | 4.6 |
| SS | 80 | 60 | 7.9 | 4.6 |

EXAMPLE TT

An investigation of the diminished corrosion rate of a steel cathode contained in an open envelope by a fluoropolymer membrane that had been treated with aqueous TEA was made, comparing it with uncovered and covered with untreated samples. Sample No. 1 was an uncovered cathode which was cleaned to remove all rust, grease, and foreign matter; it was weighed and allowed to stand exposed to ambient conditions for a period of 14 days, during which time increases in weight (indicating rusting) were recorded. Sample No. 2 was like No. 1 except that it was inserted in an envelope of untreated fluoropolymer membrane. Sample No. 3 was like No. 2 except that the membrane was treated in TEA and dried before the cathode was inserted. Data are shown in Table VI.

TABLE VI

| Days Elapsed | % Weight Gain From Rusting No. 1 | No. 2 | No. 3 | % Rate of Rust of: No. 3/No. 2 |
|---|---|---|---|---|
| 2 | 0.040 | 0.010 | 0.0 | 0 |
| 5 | 0.371 | 0.085 | 0.059 | 69.4 |
| 8 | 0.721 | 0.206 | 0.132 | 64.0 |
| 12 | 1.061 | 0.323 | 0.224 | 69.3 |
| 14 | 1.133 | 0.342 | 0.245 | 71.6 |

EXAMPLE UU

A solution of 30 wt. % triethanolamine in water was prepared and allowed to come to room temperature, 23° C. Nafion ® 324 in the hydrogen form was also allowed to come to equilibrium at room temperature and humidity (50%) by placing it on a lab table for several hours. The membrane strip was accurately measured and then immersed in the amine solution and allowed to soak for 30 minutes. The membrane was then removed from the solution and excess solution removed by wiping the surface with paper towels. The membrane was then allowed to air dry by hanging in a fashion that allowed all surfaces to be exposed to air. After drying for approximately one hour the sample was again accurately measured. The expansion was found to be 3.3% and remained in this expanded state, except for minor variations caused by humidity changes (about 0.3% expansion for a change in humidity from 40–60%), indefinitely.

EXAMPLE VV

Two samples of Nafion ® 324 having a film weight of 63.84% of the membrane weight (the remainder of the weight is Teflon ® fabric) were dried overnight in a vacuum oven (120° C., 30" vac). In both cases the percent water in the film was found to be 7.6% (4.9 moles water per sulfonic acid functional group). One sample was then treated in 30% TEA in water for 30 minutes and the other sample treated likewise for 3 hours. The samples were then redried and weighed. The amount of TEA uptake was calculated by weight gain and by titration, first for $RSO_3H$ with sodium hydroxide and then for TEA with hydrochloric acid. The following table shows the data obtained.

| Sample | Weight Ratios $RSO_3H$ | TEA | Ratios by Titration $RSO_3H$ | TEA |
|---|---|---|---|---|
| 30 min. | 1.0 | 1.1 | 1.0 | 1.0 |
| 3 hrs. | 1.0 | 1.3 | 1.0 | 1.3 |

EXAMPLE WW

Samples of a membrane comprising a reinforced composite of fluoropolymer containing carboxylic acid groups and sulfonic acid groups, the said acid groups being in the $H^+$ form, are soaked in a 30 wt. % triethanolamine (TEA) aqueous solution at ambient temperature. Soaking times of 1 hour and 24 hours are tested and measurements of linear expansion increase are made after drying for 1 day and 30 days with the samples being exposed to ambient laboratory conditions. Results are shown as follows: Soak Time in

| Soak time in TEA for $H^+$ form | Percent Linear Expansion Increase 1 day drying | 30 days drying |
|---|---|---|
| 1 hour | 4.5 | 4.5 |
| 24 hours | 5.0 | 5.0 |

In similar manner a sample of the same membrane, but in $K^+$ form, is soaked for 1 hour in the TEA solution; the percent linear expansion increase after 1 day of drying was 2.5% and after 30 days drying was 2.5%.

Considering that the untreated membrane, when used in a brine electrolysis, will undergo expansion in the range of about 4% to 6% and will thereby undergo sagging in the cell, then it is evident that the $K^+$ form will offer some degree of protection against such in-cell sagging when pre-treated according to the present invention, and that pre-treatment of the $H^+$ form according to the present invention provides much more protection by providing a stable pre-swelling which closely approximates the amount of swelling which an untreated membrane would undergo.

EXAMPLE XX

Samples of a fluoropolymer membrane containing carboxylic acid groups as the only functional groups. The samples were all strips of equal length. One sample was untreated for measurement comparisons. One sample was in the $K^+$ form and was soaked at ambient conditions for 7 hours in a 30% TEA solution. One sample was in the $H^+$ form and was also soaked for 7 hours at ambient conditions in a 30% TEA solution. The soaked samples were dried by being exposed for one day at ambient laboratory conditions. The percent linear expansion increase, as compared with the original length of the untreated sample, was as shown below:

| Form of Acid Group | Percent Increase After Drying |
|---|---|
| $K^+$ | 8.2 |

| Form of Acid Group | Percent Increase After Drying |
| --- | --- |
| $H^{30}$ | 9.6 |

It is seen that the H+ form had greater expansion than the K+ form.

EXAMPLE YY

The amine treated membranes of Examples WW and XX above are found to substantially retain their dimensions when operated in a brine electrolysis cell. During operation in a brine electrolysis cell the amine is rapidly leached out of the membranes, giving back the respective sulfonic and carboxylic acid functionalities, without encountering any substantial amount of sagging or shrinking.

In contrast thereto, the untreated membranes, when operated in a brine electrolysis cell, are found to swell and sag and the sagging membranes interfere with the cell operation.

We claim:

1. A method for substantially stabilizing the dimensions of fluoropolymer membranes for use in electrolytic cells, said fluoropolymer membranes containing sulfonate functional groups of the empirical formula R—$SO_3^-$, and/or carboxylate functional groups of the empirical formula R—$COO^-$, where R represents attachment to a fluoropolymer, said method comprising contacting the membranes at a temperature in the range of about 0° C. to 100° C. with at least one liquid amine of the group consisting of primary, secondary, and tertiary organic amines for a period of time to form easily disassociable amine salts with an appreciable amount of said acid groups, said salts conforming substantially to the empirical formula R—$SO_3$H.A and/or R—COOH.A, where A is amine, said amine moieties being easily removed by aqueous leaching, draining or drying the membranes to substantially remove excess liquid amine therefrom, storing said membranes until installment thereof in electrolytic cells.

2. The method of claim 1 wherein there is performed the additional steps of installing said membranes in brine electrolysis cells, leaching the amine moieties from the membranes with an aqueous leachant, and employing the membranes, while still wet with aqueous leachant, in the electrolysis of brine.

3. The method of claim 2 wherein the aqueous leachant is an aqueous electrolyte for the electrolysis of brine.

4. The method of claim 1 wherein the amine is dissolved in a solvent.

5. The method of claim 4 wherein the solvent is water or alcohol or mixture thereof.

6. The method of claim 1 wherein the amine is at least one selected from the group consisting of diethanolamine, triethanolamine, n-octyl amine, benzylmethylamine, N,N'-dimethylbenzylamine, dodecylamine, tert-octylamine, tri-n-octylamine, ethanolamine, diethylene triamine, isopropanolamine, diisopropanolamine, and triisopropanolamine.

7. The method of claim 1 wherein the fluoropolymer is at least one selected from the group consisting of solid copolymers of tetrafluoroethylene with a perfluorosulfonylethoxy vinyl ether, and solid copolymers of sulfostyrenated perfluoroethylenepropylene, wherein pendant sulfonyl groups have been hydrolyzed to sulfonic acid functional groups prior to contact with said amines.

8. The method of claim 1 wherein the amine or mixture of amines is dissolved in alcohol and/or water at a weight concentration of from about 2% to about 60%, the contact time is from about 2 minutes to about 24 hours, the contact temperature is from about 20° C. to about 80° C., and the thickness of the membrane is in the range of about 1 mil to about 20 mils.

9. The method of claim 1 wherein the amine comprises at least one of the group consisting of triethanolamine, trioctylamine, octylamine, diethanolamine, and dodecylamine.

10. The method of claim 1 wherein the membrane comprises a bilayered sheet of two films having the same or different eq. wts. and the same or different functionalities.

11. The dried membrane containing easily disassociable amine salts of said sulfonate functional groups prepared in accordance with claim 1.

12. The method of claim 1 wherein the fluoropolymer contains sulfonic acid groups.

13. The method of claim 1 wherein the fluoropolymer contains carboxylic acid groups.

14. The method of claim 1 wherein the fluoropolymer is a composite of fluoropolymer containing sulfonic acid groups and fluoropolymer containing carboxylic acid groups.

* * * * *

UNITED STATES PATENT AND TRADEMARK OFFICE
CERTIFICATE OF CORRECTION

PATENT NO. : 4,376,030

DATED : March 8, 1983

INVENTOR(S) : Bobby R. Ezzell, Harry S. Burney and Marius W. Sorenson

It is certified that error appears in the above—identified patent and that said Letters Patent is hereby corrected as shown below:

Col. 1, line 37; "prefluorinated" should read --perfluorinated--

Col. 3, line 18; "begin" should read --being--.

Col. 3, line 24; "substantialy" should read --substantially--.

Col. 3, line 25; "a" should read --an--.

Col. 8, line 27; delete the words "Soak Time in".

Col. 8, line 67; "Group" should read --Groups--.

Col. 9, line 4; "$H^{30}$" should read --$H^+$--.

Signed and Sealed this

Fifth Day of July 1983

[SEAL]

Attest:

GERALD J. MOSSINGHOFF

Attesting Officer    Commissioner of Patents and Trademarks